United States Patent
Meyers et al.

(10) Patent No.: US 12,286,933 B2
(45) Date of Patent: Apr. 29, 2025

(54) AIR TURBINE STARTER

(71) Applicant: Unison Industries, LLC, Jacksonville, FL (US)

(72) Inventors: Shiloh Montegomery Meyers, Miamisburg, OH (US); Steven Ryan Kerley, Columbus, OH (US); Thomas V Ng, Lebanon, OH (US)

(73) Assignee: Unison Industries, LLC, Jacksonville, FL (US)

( * ) Notice: Subject to any disclaimer, the term of this patent is extended or adjusted under 35 U.S.C. 154(b) by 0 days.

(21) Appl. No.: 18/306,574

(22) Filed: Apr. 25, 2023

(65) Prior Publication Data
US 2024/0360794 A1    Oct. 31, 2024

(51) Int. Cl.
*F02C 7/277* (2006.01)
*F02C 7/05* (2006.01)

(52) U.S. Cl.
CPC .............. *F02C 7/277* (2013.01); *F02C 7/05* (2013.01); *F05D 2260/85* (2013.01)

(58) Field of Classification Search
CPC ......... F02C 7/277; F02C 7/05; F05D 2260/85
See application file for complete search history.

(56) References Cited

U.S. PATENT DOCUMENTS

| | | |
|---|---|---|
| 2,987,296 A | 6/1961 | Ferguson, Jr. |
| 3,048,364 A | 8/1962 | Troeger et al. |
| 3,097,824 A | 7/1963 | Bunger et al. |
| 3,261,228 A | 7/1966 | Rothman |
| 4,509,896 A | 4/1985 | Linsker |
| 4,914,906 A | 4/1990 | Burch |
| 4,955,192 A | 9/1990 | Shekleton |
| 6,533,541 B1 | 3/2003 | Farnsworth et al. |
| 7,722,323 B2 | 5/2010 | Elsmark |
| 8,376,700 B2 | 2/2013 | Le Saint |
| 8,932,002 B2 | 1/2015 | Makulec et al. |
| 10,316,756 B2 | 6/2019 | Gentile et al. |
| 10,724,444 B2 | 7/2020 | Martinez et al. |
| 2003/0161721 A1* | 8/2003 | Farnsworth ........... F01D 21/045 415/121.1 |
| 2012/0006035 A1 | 1/2012 | Makulec et al. |
| 2017/0370294 A1* | 12/2017 | Gentile ................. F01D 21/045 |
| 2022/0056813 A1 | 2/2022 | Kurvinkop |
| 2022/0065168 A1* | 3/2022 | Chhabra ................. F02C 7/277 |
| 2022/0243601 A1 | 8/2022 | Dhabade |

FOREIGN PATENT DOCUMENTS

FR    2640684 B1    6/1990

\* cited by examiner

*Primary Examiner* — Grant Moubry
*Assistant Examiner* — Ruben Picon-Feliciano
(74) *Attorney, Agent, or Firm* — McGarry Bair PC

(57) ABSTRACT

An air turbine starter for starting an engine includes a starter housing defining an inlet, an outlet, and a flow path extending between the inlet and the outlet. The air turbine starter can include a rotatable turbine member having a central hub defining a platform and at least one blade extending radially from the platform. The air turbine starter can also include a blade cutter.

20 Claims, 5 Drawing Sheets

AIR TURBINE STARTER

TECHNICAL FIELD

The disclosure generally relates to a starter for a combustion engine, and more specifically to an air turbine starter having a rotatable turbine element.

BACKGROUND

A combustion engine can be engaged in regular operation to an air turbine starter (ATS). The ATS can be used to initiate the rotation of the combustion engine. The ATS is often mounted near the engine and can be coupled to a fluid source, such as compressed air, which impinges upon a turbine rotor in the ATS causing it to rotate at a relatively high rate of speed. The ATS includes an output shaft that is coupled to the turbine rotor, typically through a reducing gear box. The output shaft can be driven to cause a rotatable element of the combustion (e.g. a crankshaft) to begin rotating. Such rotation by the ATS continues until the combustion engine attains a self-sustaining rotational speed.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
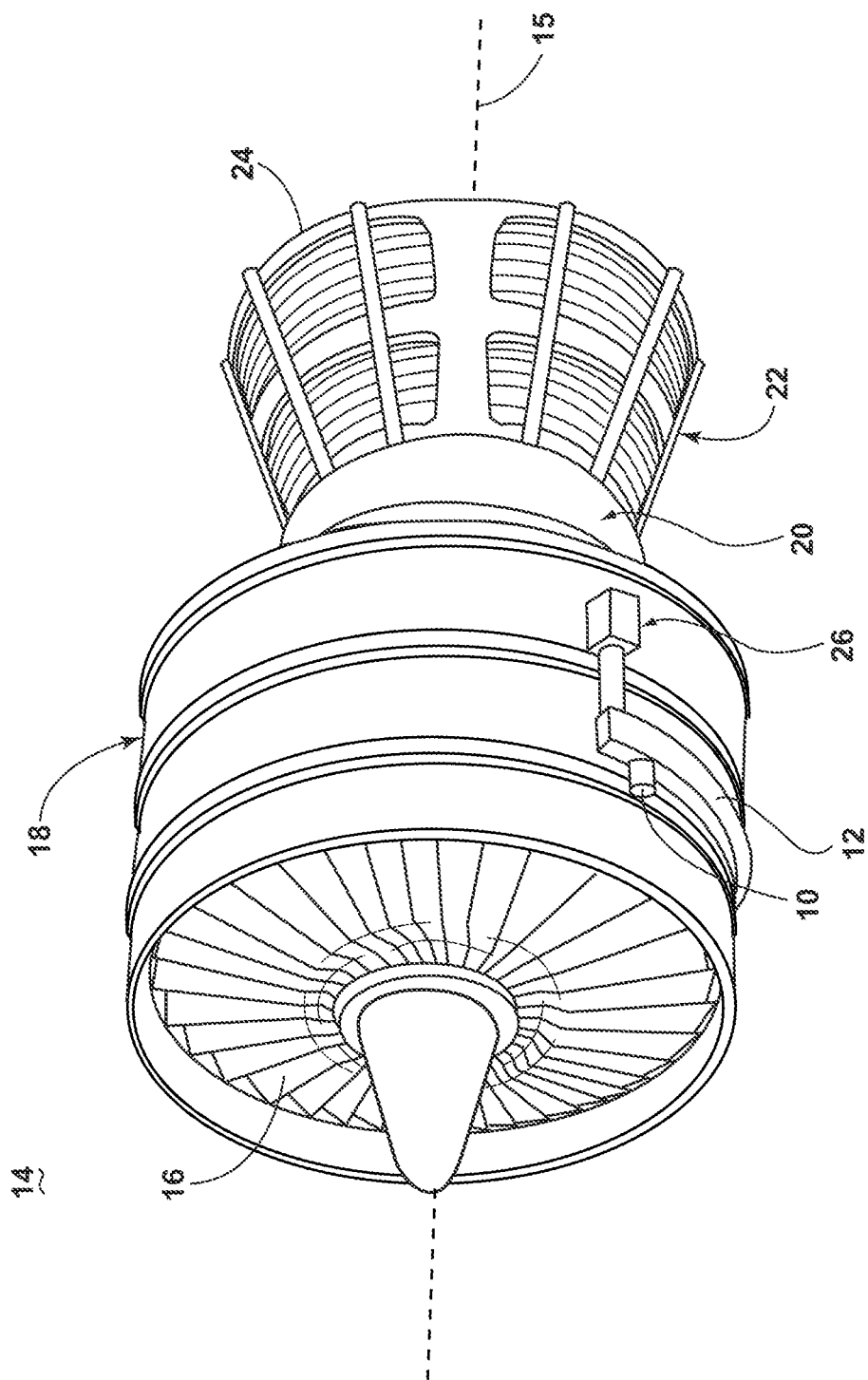
FIG. 1 is a perspective view of a turbine engine in accordance with various aspects described herein.

Aspects of the present disclosure are broadly directed to an air turbine starter for starting an engine. For the purposes of illustration, one exemplary environment within which the air turbine starter can be utilized will be described in the form of a turbine engine. Such a turbine engine can be in the form of a gas turbine engine, a turboshaft, or a turbofan engine, in non-limiting examples. It will be understood, however, that the disclosure is not so limited and can have general applicability for any implementation of a driving mechanism that generates rotational motion at a driving output and provides the rotational motion to another piece of rotating equipment. For example, the disclosure can have applicability for a starter for other engines or vehicles, and may be used to provide benefits in industrial, commercial, and residential applications.

Air turbine starters (ATSs) can generally include a rotor with a rotatable turbine member having a central hub and a plurality of airfoils extending therefrom. During normal or standard operation of the air turbine starter, the rotor is driven by fluid flow through the turbine member and rotates in place with minimal or zero axial translation, wobbling, or the like. In certain circumstances, including but not limited to rotational imbalances in the turbine member, changes in a bearing assembly supporting the rotor, or certain applied loads on the ATS, the rotor can undergo additional position changes, including translational motion or rotational imbalance, within the ATS. Such position changes can lead to undesirable contact or impacts within the ATS, such as between the turbine member and interior portions of the ATS such as the starter housing, air flow ducts, or the like.

Cutting elements can be provided adjacent the turbine member for releasing portions thereof when a position change of the turbine member exceeds a predetermined threshold. Traditional cutting elements are typically oriented to confront the central hub at a position radially spaced from the rotational center of the hub. Rotation of the hub against the cutting element can cause a radially outer portion of the central hub, along with the airfoils, to be released from the turbine member into the flow path. In some examples, a containment device can be provided to catch released fragments of the central hub and airfoils.

The central hub can have a larger mass relative to the plurality of airfoils. In such a case, the use of typical cutting elements described above can release a significant component mass and/or a large number of fragments into the flow path. In addition, rotor position changes preceding the cutting operation can cause fragments to enter the flow path with variable or unpredictable fragment sizes or trajectories. In certain implementations where a containment device is provided, the design of such a containment device would need to be sufficiently robust to capture a large number of fragments collectively having a large mass and a wide or variable dispersal.

Aspects of the disclosure provide for a blade cutter that can be utilized to liberate airfoil portions of a turbine member without releasing the hub. Aspects of the disclosure additionally provide for liberated fragments having lower energies, more predictable trajectories, and a reduced overall mass for containment compared to traditional cutting assemblies.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

Additionally, as used herein, the terms "radial" or "radially" refer to a direction toward or away from a common center. For example, the term "radial" can refer to a direction extending perpendicularly from a center longitudinal axis of a component. Furthermore, as used herein, the term "set" or a "set" of elements can be any number of elements, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are used only for identification purposes to aid the reader's understanding of the present disclosure, and should not be construed as limiting on an embodiment, particularly as to the position, orientation, or use of aspects of the disclosure described herein. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are provided for purposes of illustration only and the dimensions, positions, order and relative sizes reflected in the drawings attached hereto can vary.

Referring to FIG. 1, an air turbine starter 10 (referred to herein as "ATS 10") and an accessory gear box 12 (referred to herein as "AGB 12") are schematically illustrated. The ATS 10 can be coupled to the AGB 12. In the exemplary implementation shown, the ATS 10 and the AGB 12 can each be mounted to a turbine engine 14, such as a gas turbine engine. Such an assembly is commonly referred to as an Integrated Starter/Generator Gearbox (ISGB). It is understood that aspects of the disclosure are not limited to ISGBs and can have general applicability to isolated air turbine starters.

The turbine engine 14 defines an engine axis 15 and includes an air intake with a fan 16 that supplies air to a high pressure compression region 18. The air intake with the fan 16 and the high pressure compression region 18 collectively are known as the "cold section" of the turbine engine 14. The cold section is located upstream of the combustion.

During operation of the turbine engine 14, the high pressure compression region 18 provides a combustion chamber 20 with high pressure air. In the combustion chamber 20, the high pressure air is mixed with fuel and combusted. Hot and pressurized combustion gases pass through a high pressure turbine region 22 and a low pressure turbine region 24 before exhausting from the turbine engine 14. As the combustion gases pass through the high pressure turbine region 22 and the low pressure turbine region 24, kinetic energy is extracted from the flow of the gases passing through the turbine engine 14. A shaft can connect the high pressure turbine region 22 to the high pressure compression 18 region to power the compression mechanism. The low pressure turbine can be coupled to the fan 16 of the air intake by way of a shaft to power the fan 16.

The AGB 12 can be coupled to the turbine engine 14 at either the high pressure turbine region 22 or the low pressure turbine region 24 by way of a mechanical power take-off 26. The mechanical power take-off 26 can contain multiple gears and components for mechanical coupling of the AGB 12 to the turbine engine 14. Under normal operating conditions, the power take-off 26 transmits power from the turbine engine 14 to the AGB 12 to power accessories of the aircraft, such as fuel pumps, electrical systems, or cabin environment controls, in non-limiting examples.

The ATS 10 can be mounted on the outside of the air intake region containing the fan 16, or on the core near the high-pressure compression region 18, in non-limiting examples.

Figure 2:
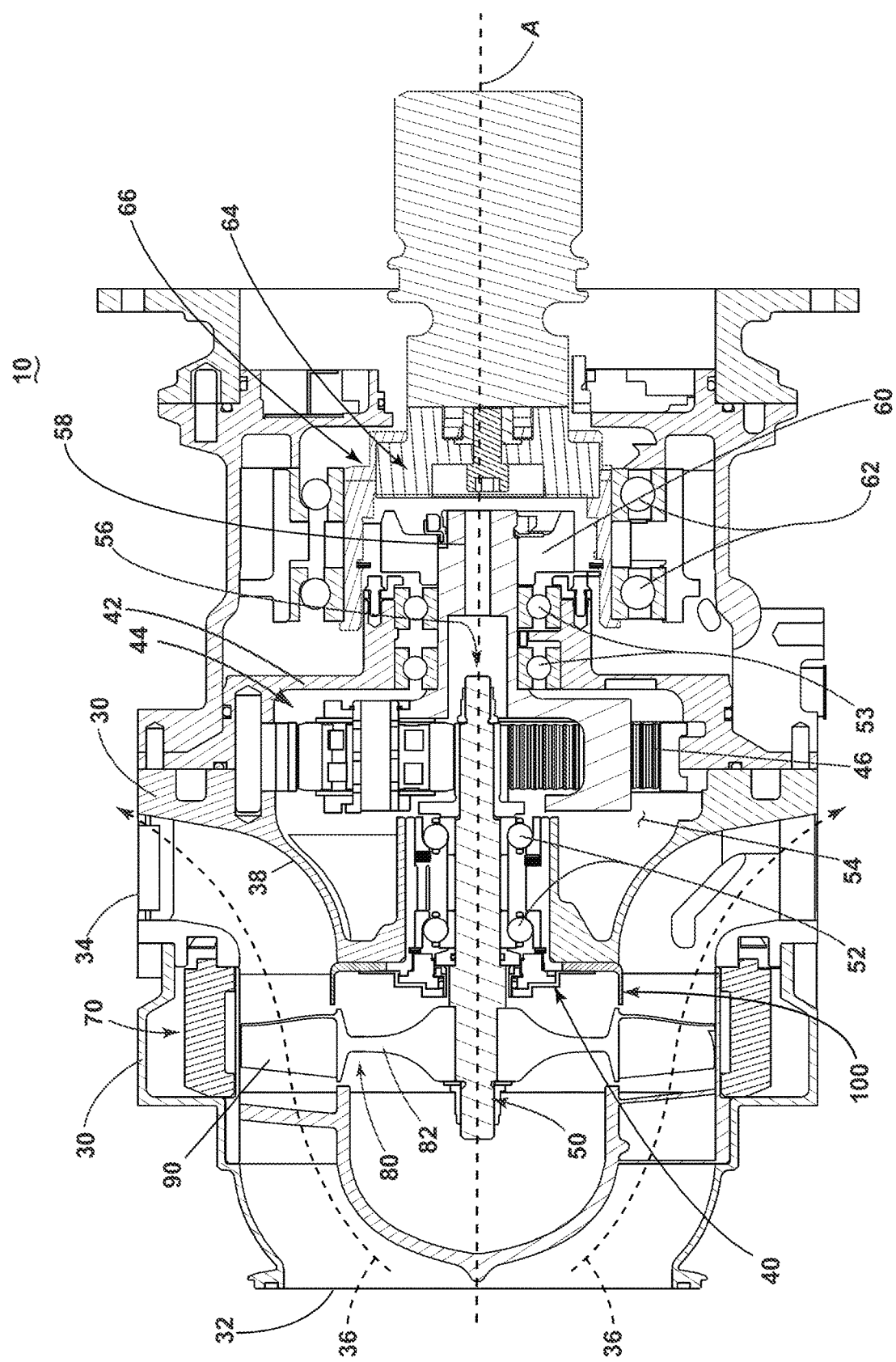
FIG. 2 is a cross-sectional view of an air turbine starter that can be utilized with the turbine engine of FIG. 1 in accordance with various aspects described herein.

Referring now to FIG. 2, the ATS 10 is shown in cross section. The ATS 10 includes a starter housing 30 defining an axial direction A as shown. In some examples, the axial direction A can be parallel to the engine axis 15 (FIG. 1). The starter housing 30 also defines an inlet 32, an outlet 34, and a flow path 36 extending between the inlet 32 and outlet 34 for communicating a flow of fluid therethrough. Such fluid can be a gas or liquid, and can also include a pressurized fluid such as compressed air, in non-limiting examples. In addition, an annular duct 38 can be provided in the starter housing 30 and can at least partially define the flow path 36. In one non-limiting example, the duct 38 can form the outlet 34.

A rotatable turbine member 80 is located within the starter housing 30. The turbine member 80 includes a central hub 82 and one or more blades 90 extending radially therefrom. The blades 90 are disposed within the flow path 36 for rotatably extracting mechanical power from the flow of gas along the flow path 36. Further, while a single turbine member 80 is illustrated, it is contemplated that multiple turbine members 80 can be provided to form multiple turbine stages within the ATS 10.

A blade cutter 100 can be provided in the ATS 10. The blade cutter 100 can confront the turbine member 80 as shown. The blade cutter 100 can be configured to contact and release portions of the turbine member 80, such as the blades 90, during certain operating conditions of the ATS 10. A containment system 70 can also be provided surrounding the turbine member 80. The containment system 70 can be configured to capture released portions of the turbine member 80, thereby preventing fragments from exiting the ATS 10 with high energy.

In addition, at least one seal 40 can be located within the starter housing 30. The seal 40 can be mounted to the starter housing 30, though this need not be the case. The seal 40 can at least partially fluidly seal the flow path 36 from other portions of the air turbine starter 10.

A gear box 42 is illustrated as mounted within the starter housing 30. A gear train 44 can be disposed within the gear box 42 and drivingly coupled with the turbine member 80. In the illustrated example, the gear train 44 includes a ring gear 46. It will be understood that the gear train 44 can include any suitable gear assembly including, but not limited to, a planetary gear assembly, a pinion gear assembly, or the like. A turbine shaft 50 couples the gear train 44 to the turbine member 80 allowing for the transfer of mechanical power to the gear train 44. The turbine shaft 50 is coupled to the gear train 44 and rotatably supported by a pair of turbine bearings 52. The gear train 44 is supported by a pair of carrier bearings 53.

A gear box interior 54 can be provided for containing a lubricant, including, but not limited to, grease or oil. The gear box interior 54 can provide lubrication and cooling to mechanical parts contained therein, such as the gear train 44, ring gear 46, turbine bearings 52, carrier bearings 53, or the like.

An aperture 56 is provided in the gear box 42. The turbine shaft 50 can extend through the aperture 56 and mesh with a carrier shaft 58 to which a clutch 60 is mounted and supported by a pair of spaced bearings 62. A drive shaft 64 extends from the gear box 42 and is coupled to the clutch 60 and additionally supported by the pair of spaced bearings 62. The drive shaft 64 is driven by the gear train 44 and coupled to the AGB 12 (FIG. 1), such that during a starting operation the drive shaft 64 provides a driving motion to the AGB 12.

The clutch 60 can be any type of shaft interface portion that forms a single rotatable shaft 66 comprising the turbine shaft 50, the carrier shaft 58, and the drive shaft 64. The shaft interface portion can be by any known method of coupling including, but not limited to, gears, splines, a clutch mechanism, or the like, or combinations thereof.

The ATS 10 can be formed by any materials and methods, including, but not limited to, die-casting of high strength and lightweight metals such as aluminum, stainless steel, iron, titanium, or the like. The starter housing 30 and the gear box 42 can be formed with a thickness sufficient to provide adequate mechanical rigidity without adding unnecessary weight to the ATS 10. Furthermore, the rotatable shaft 66 can be constructed by any materials and methods, including, but not limited to, extrusion or machining of high strength metal alloys such as those containing aluminum, iron, nickel, chromium, titanium, tungsten, vanadium, or molybdenum. The diameter of the turbine shaft 50, carrier shaft 58, and drive shaft 64 can be fixed or vary along the length of the rotatable shaft 66. In non-limiting examples, the diameter of the turbine shaft 50 can vary to accommodate different sizes of components coupled thereto, or to accommodate a variable rotor-to-stator spacing.

During a starting operation, fluid such as air supplied along the flow path 36 rotates the turbine member 80 for driving the rotation of the rotatable shaft 66. In some non-limiting examples, the fluid can be air supplied from a ground-operating air cart, an auxiliary power unit, or a cross-bleed start from an engine already operating. In this manner, the ATS 10 can form a driving mechanism for starting the turbine engine 14 (FIG. 1) via rotation of the rotatable shaft 66.

In addition, in certain conditions during a starting operation, portions of the ATS 10 can undergo a position change including, but not limited to, translational motion such as axial translation or radial translation, compound rotational motion such as shifting to rotate in a non-radial plane, or rotational imbalances such as wobbling or oscillation. In some instances, any or all of the turbine member 80, the turbine shaft 50, the carrier shaft 58, the drive shaft 64, or the rotatable shaft 66, in non-limiting examples, can undergo a position change. In one example, the turbine shaft 50 can undergo a position change by shifting or translating axially forward or aft during rotation. In another example, the turbine shaft 50 can undergo a position change by shifting into a new orientation within the ATS 10 such that the turbine member 80 rotates in a new rotational plane. In still another example, the turbine member 80 can undergo a position change by a rotational imbalance causing wobbling or oscillations. Regardless of the type of position change, it is contemplated that such position changes can cause the rotating turbine member 80 to contact interior portions of the ATS 10.

Figure 3:
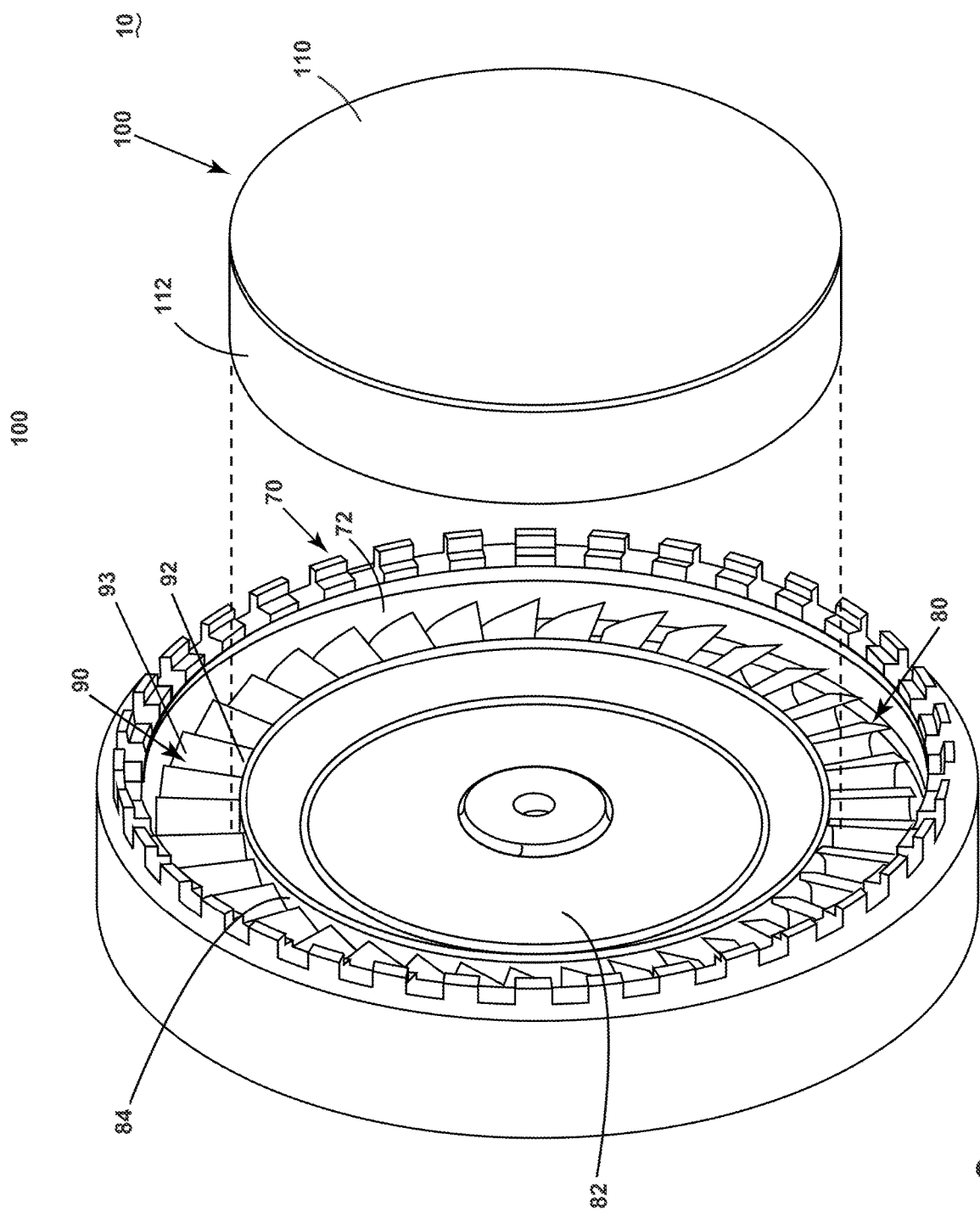
FIG. 3 is a schematic perspective view illustrating a turbine member and a blade cutter in the air turbine starter of FIG. 2 in accordance with various aspects described herein.

Turning to FIG. 3, the blade cutter 100, the turbine member 80, and the containment system 70 are shown in isolation. The central hub 82 can define a platform 84. Each blade 90 extends radially from the platform 84 between a root 92 and a tip 93. In addition, in the non-limiting example shown, the containment system 70 includes a containment ring 72 positioned radially outward of the turbine member 80 and spaced from the tips 93.

The blade cutter 100 is schematically illustrated in FIG. 3, and it is understood that the blade cutter 100 can have any suitable form. In the non-limiting example shown, the blade cutter 100 can include a disk 110 with an axially-extending cutting edge 112. The blade cutter 100 is illustrated with a continuous cutting edge 112 in the non-limiting example shown, though this need not be the case. The blade cutter 100 can also include a continuous disk, or a set of circumferentially-arranged segments with cutter portions, or a non-continuous cutting edge 112, or a set of discrete cutting edges 112, or the like, in non-limiting examples. Furthermore, while the cutting edge 112 is illustrated as extending parallel to the axial direction A, it is contemplated that the cutting edge 112 can extend at any angle, including at least partially radially in a non-limiting example. In still another example, the blade cutter 100 can include multiple discrete cutting edges 112 that can be aligned with the axial direction A, or forming an acute angle with the axial direction A, in non-limiting examples.

The blade cutter 100 can include a hardened material compared to either or both of the central hub 82 or the blades 90. As used herein, a "hardened material" will refer to a material having a greater material hardness, yield strength, true tensile strength, modulus of elasticity, bulk strength, shear strength, Mohs-scale hardness, or the like, when compared to a second material. For example, the blade cutter 100 can have a greater material hardness compared to that of the blades 90. In one exemplary implementation, the blades 90 can include steel and the blade cutter 100 can include a diamond tip.

In some implementations, the blade cutter 100 can also include a material having a high temperature capability. As used herein, "temperature capability" will refer to the highest operating temperature contemplated for use for a given material, wherein subjecting the material to temperatures higher than its temperature capability can cause effects such as oxidation, fatigue, plastic deformation, or melting of the material. For example, the blade cutter 100 can include steel, ceramic, silicon carbide, including steel coated with a ceramic outer layer or tip, or a silicon carbide coating, or a hard material cold spray coating, or an electrodeposited outer layer, or the like.

Figure 4:
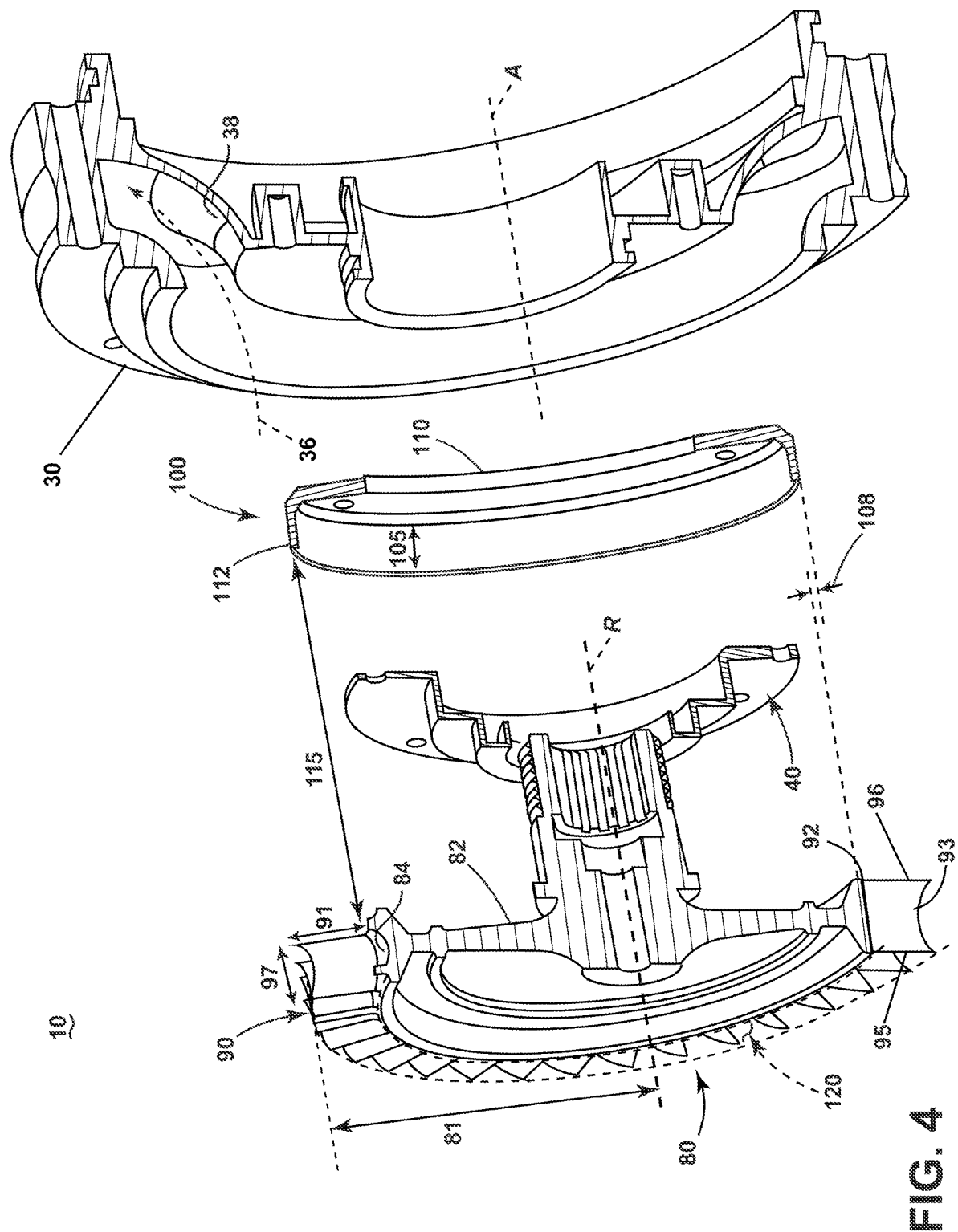
FIG. 4 is a partially-exploded cross-sectional view of a portion of the air turbine starter of FIG. 2.

Referring now to FIG. 4, a partially-exploded view of a portion of the ATS 10 illustrates the turbine member 80 arranged with the blade cutter 100 and a portion of the starter housing 30. The containment system 70 (FIG. 3) is omitted for visual clarity.

The turbine member 80 is shown with the central hub 82 and the blades 90. The central hub 82 is rotatable about a rotation axis R as shown. In the illustrated example, the rotation axis R is aligned with the axial direction A though this need not be the case. The turbine member 80 also defines a turbine member length 81 from the rotation axis R to the tips 93 of the blades 90.

As described above, the blades 90 extend radially between corresponding roots 92 and tips 93. A blade length 91 is defined span-wise for each blade 90 between the root 92 and the tip 93 as shown. In addition, each blade 90 extends axially between a leading edge 95 and a trailing edge 96. An axial chord length 97 is also defined as an axial distance between the leading edge 95 and the trailing edge 96.

The blade cutter 100 can be located downstream of the turbine member 80. The blade cutter 100 defines a cutter length 105 as shown. In the illustrated example, the cutter length 105 is less than the axial chord length 97. It is understood that the cutter length 105 can be greater than or equal to the axial chord length 97 in some implementations.

During normal or standard operation of the ATS 10, and with normal or standard rotation of the turbine member 80, the root 92 and tip 93 of each blade 90 sweeps through an annular swept area 120. It is understood that the annular swept area 120 represents a spatial region within which the blades 90 are normally positioned during standard rotation of the turbine member 80, whereby any position changes of the turbine member 80 are within tolerance for operation of the ATS 10.

The blade cutter 100 is arranged such that the cutting edge 112 is in registry with the annular swept area 120. In one example, the cutting edge 112 can be radially positioned closer to the root 92 than the tip 93 of each blade 90. For instance, the cutting edge 112 can be radially spaced from the root 92 to define a cutting distance 108 with respect to the root 92. It is contemplated that the cutting distance 108 can be a predetermined amount based on the blade length 91, including between 0-60% of the blade length 91, or between 0-50% of the blade length 91, or between 0-40% of the blade length 91, or between 0-30% of the blade length 91, in non-limiting examples. In this manner, the blade cutter 100 can be located proximate the platform 84.

In addition, the seal 40 can be positioned adjacent to the turbine member 80 as shown. In the illustrated example, the seal 40 includes a bearing sleeve, though this need not be the case. The seal 40 can be formed of any suitable material including, but not limited to, steel, aluminum, nickel or nickel alloy, carbon, graphite, a polymeric material, a composite material, or the like, or combinations thereof. In addition, regardless of the specific material selected, it is also contemplated that the seal 40 can be frangible or crushable under a predetermined axial force. In addition, in the exemplary implementation shown, the blade cutter 100 is configured to be mounted between the starter housing 30 and the seal 40, e.g. radially between the starter housing 30 and the seal 40, though this need not be the case. The blade cutter 100 can be coupled, mounted, or the like to any suitable portion of the ATS 10.

The duct 38 is positioned downstream of the blade cutter 100 as shown. It is further contemplated that the blade cutter 100 can at least partially define the flow path 36 upstream of the duct 38. In the non-limiting example shown, the blade cutter 100 is positioned to extend into the flow path 36, thereby narrowing the flow path 36 upstream of the duct 38, though this need not be the case. The blade cutter 100 can also be in registry with the duct 38 to form a constant-width flow path 36 in some implementations.

Furthermore, the blade cutter 100 can be located proximate the platform 84. Particularly, an operative spacing distance 115 is defined between the blade cutter 100 and the turbine member 80 during standard rotation of the turbine member 80. More specifically, the operative spacing distance 115 can be defined between the cutting edge 112 and the trailing edges 96 of the blades 90 during balanced rotation. It is understood that in the partially-exploded view of FIG. 4, the operative spacing distance 115 is visually expanded compared to when the ATS 10 is assembled (e.g., as shown in FIG. 2).

During normal or standard operation of the ATS 10, the blade cutter 100 and the turbine member 80 do not contact one another and the corresponding operative spacing distance 115 is a value greater than 0 cm. For instance, in a non-limiting example of the turbine member 80 being perfectly balanced, the turbine member 80 does not undergo any translational motion (e.g. axial translation) during rotation. In another example where a small rotational imbalance is present in the turbine member 80, the turbine member 80 is translated by a small amount, such as between 0-30 cm in a non-limiting example. It is understood that under normal or standard operation, the operative spacing distance 115 defines a standard value representing a threshold or tolerance for rotational imbalances. For instance, the operative spacing distance 115 can define a standard value between 0.1-10 cm, including between 0.1-5 cm, or between 0.2-4 cm, or between 0.2-3 cm, or between 0.5-3 cm, in some non-limiting examples.

Figure 5:
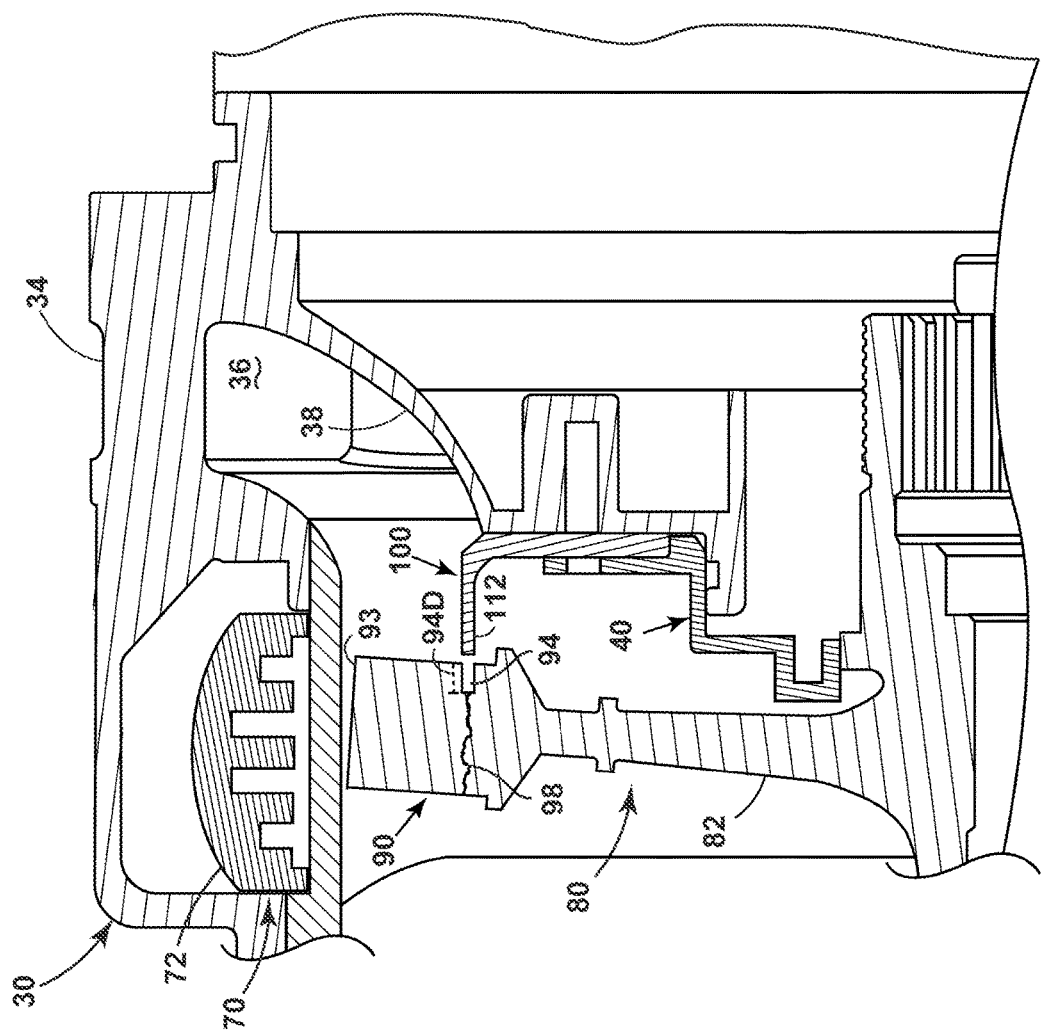
FIG. 5 is a cross-sectional view illustrating the air turbine starter of FIG. 2 during an example of operation.

Turning to FIG. 5, a portion of the ATS 10 is illustrated with the containment system 70, the turbine member 80, and the blade cutter 100 assembled as shown. The containment ring 72 surrounds the turbine member 80.

In the illustrated example, the turbine member 80 is shown with a position change compared to normal or standard operation. Such a position change can arise from rotational imbalance of the turbine member 80, or translation of the turbine shaft 50, or the like, in non-limiting examples. In the example shown, the position change of the turbine member 80 includes an axial shift of the central hub 82 such that the operative spacing distance 115 (FIG. 4) is reduced from its standard value.

When the operative spacing distance 115 (FIG. 4) is reduced to 0 cm, the blade cutter 100 contacts the rotating blades 90 and removes blade material. In one non-limiting example of operation, the turbine member 80 can exert at least an axial force on the seal 40 and cause fragmentation of the seal 40, providing for contact between the blades 90 and the blade cutter 100. In another non-limiting example of operation, the seal 40 can remain in place without fragmentation during contact between the blades 90 and the blade cutter 100.

An exemplary cut 94 is illustrated extending into the blade 90 as a result of contact with the blade cutter 100. It is understood that the cut 94 extends at least along the axial chord length 97 (FIG. 4). The cut 94 can define a cut depth 94D into the blade 90. In the non-limiting example shown, the cut depth 94D is defined axially from the trailing edge 96. It is understood that the cut depth 94D can be defined with respect to any surface of the blade 90 upon which the blade cutter 100 makes contact.

With continued rotation of the turbine member 80 and progression of the cut 94, a separation 98 such as cracking, splintering, or the like can spontaneously form along the blade 90 due to material stresses within the blade 90. The separation 98 can propagate across the blade 90 such that the blade 90 is released from the platform 84 (FIG. 4). It is understood that the blade cutter 100 need not form the cut 94 fully across the blade, as the separation 98 can form with the presence of a partial cut 94. For example, material stresses at the root 92 of the blade 90 can contribute to spontaneous formation of the separation 98 when the cut 94 extends partially across the blade 90. It is additionally contemplated that the cut depth 94D can be a predetermined amount based on the axial chord length 97. In some non-limiting examples, the cut depth 94D can be a nonzero value between 0-60% of the axial chord length 97, or a nonzero value between 0-50% of the axial chord length 97, or a nonzero value between 0-40% of the axial chord length 97, or a nonzero value between 0-30% of the axial chord length 97.

In this manner, the blade cutter 100 can be configured to liberate or release one or more blades 90 in the event of the turbine member 80 undergoing a position change, including an imbalance condition or translational motion as described above. With removal of one or more blades 90, motive forces are reduced or removed and the rotational speed of the turbine member 80 is slowed. In addition, the released blades 90 or fragments can be captured by the containment system 70, thereby preventing high-energy fragments from exiting the duct 38.

The described aspects of the present disclosure can provide for multiple benefits. One benefit is that the radially-outer cutter positioning removes material with a large moment of inertia from the turbine member, which provides for a more efficient inertia reduction of the turbine member compared to traditional cutters confronting the hub. Another benefit is that less material is released from the turbine member compared to traditional cutters confronting the hub, providing for a reduction in liberated fragment mass and size, as well as improved performance by the containment ring in receiving and capturing released fragments, when compared to traditional cutter arrangements. Still another benefit is that alignment of the disclosed blade cutter proximate to the blade roots removes material in regions where a partial cut can form a self-propagating separation line and blade release, which provides for a prolonged cutter part lifetime in addition to a more compact or lightweight part that need not be capable of extending fully through the blade.

This written description uses examples to disclose aspects of the present subject matter, including the best mode, and also to enable any person skilled in the art to practice aspects of the present subject matter, including making and using any devices or systems and performing any incorporated methods. The patentable scope of the present subject matter is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects of the disclosure are provided by the subject matter of the following clauses:

An air turbine starter for starting an engine, comprising: a starter housing defining an inlet, an outlet, and a flow path extending between the inlet and the outlet; a rotatable turbine member located within the starter housing and comprising: a central hub defining a platform, and at least one blade extending radially from the platform between a root and a tip, with the root and tip defining an annular swept area during normal rotational operation; and a blade cutter located downstream of the turbine member and in registry with the annular swept area.

The air turbine starter of any preceding clause, wherein the blade cutter comprises a disk with a cutting edge extending at least axially.

The air turbine starter of any preceding clause, wherein the cutting edge is radially positioned closer to the root than the tip.

The air turbine starter of any preceding clause, further comprising a blade length defined between the root and the tip, with the cutting edge radially spaced from the root to define a cutting distance of 0-40% of the blade length.

The air turbine starter of any preceding clause, wherein the at least one blade defines an axial chord length and the blade cutter is configured to form a cut in the at least one blade defining a cut depth for removing the at least one blade, wherein the cut depth is a nonzero value between 0-40% of the axial chord length.

The air turbine starter of any preceding clause, wherein the at least one blade defines an axial chord length and the blade cutter defines a cutter length less than the axial chord length.

The air turbine starter of any preceding clause, wherein the blade cutter at least partially defines the flow path.

The air turbine starter of any preceding clause, further comprising a seal located adjacent the turbine member and coupled to the blade cutter.

The air turbine starter of any preceding clause, further comprising a containment ring positioned radially outward of the turbine member.

An air turbine starter for starting an engine, comprising: a starter housing defining an inlet, an outlet, and a flow path extending between the inlet and the outlet; a rotatable turbine member comprising a central hub defining a platform, and at least one blade extending radially from the platform between a root and a tip; and a blade cutter confronting the blade between the root and the tip and located proximate the platform.

The air turbine starter of any preceding clause, wherein the blade cutter comprises a disk with an axially-extending cutting edge.

The air turbine starter of any preceding clause, further comprising a blade length defined between the root and the tip, with the cutting edge radially spaced from the root between 0-40% of the blade length.

The air turbine starter of any preceding clause, wherein the blade defines an axial chord length and the blade cutter defines a cutter length less than the axial chord length.

The air turbine starter of any preceding clause, wherein the blade defines an axial chord length and the blade cutter is configured to form a cut in the blade defining a cut depth for removing the at least one blade, wherein the cut depth is a nonzero value between 0-40% of the axial chord length.

The air turbine starter of any preceding clause, further comprising a containment ring positioned radially outward of the turbine member.

An air turbine starter for starting an engine, comprising: a starter housing defining an inlet, an outlet, and a flow path extending between the inlet and the outlet; a rotatable turbine member comprising a central hub defining a platform, and at least one blade extending radially from the platform between a root and a tip, and also extending between a leading edge and a trailing edge to define an axial chord length; and a blade cutter confronting the at least one blade proximate the root, wherein the blade cutter defines an axial cutter length less than the axial chord length.

The air turbine starter of any preceding clause, wherein the blade cutter at least partially defines the flow path.

The air turbine starter of any preceding clause, wherein the blade cutter extends radially into the flow path.

The air turbine starter of any preceding clause, wherein the blade cutter comprises a disk with an axially-extending cutting edge.

The air turbine starter of any preceding clause, wherein the blade cutter comprises one of a continuous cutting edge, a non-continuous cutting edge, or a set of discrete cutting edges.

The air turbine starter of any preceding clause, wherein the blade cutter is configured to form a cut in the blade defining a cut depth for removing the at least one blade, wherein the cut depth is a nonzero value between 0-40% of the axial chord length.

The air turbine starter of any preceding clause, further comprising a containment ring positioned radially outward of the turbine member.

The air turbine starter of any preceding clause, further comprising a seal at least partially fluidly sealing the flow path.

The air turbine starter of any preceding clause, wherein the blade cutter is mounted between the seal and the starter housing.

The air turbine starter of any preceding clause, wherein the seal comprises a frangible material configured to fragment under an axially-applied force from the turbine member.

The air turbine starter of any preceding clause, wherein the seal comprises at least one of steel, aluminum, nickel or nickel alloy, carbon, graphite, a polymeric material, or a composite material.

The air turbine starter of any preceding clause, wherein the blade cutter comprises at least one of steel, ceramic, diamond, or silicon carbide.

The air turbine starter of any preceding clause, wherein the blade cutter comprises a first material and the at least one blade comprises a second material, with the first material having at least one of a greater hardness or a greater temperature capability compared to the second material.

What is claimed is:

1. An air turbine starter for starting an engine, comprising:
   a starter housing defining an inlet, an outlet, and a flow path extending between the inlet and the outlet;

a rotatable turbine member located within the starter housing and comprising a central hub defining a platform, and at least one blade extending radially from the platform between a root and a tip, with the root and tip defining an annular swept area during normal rotational operation; and a blade cutter located downstream of the rotatable turbine member and in registry with the annular swept area, wherein the at least one blade has a blade length defined between the root and the tip, and wherein the blade cutter has a cutting edge radially spaced from the root to define a cutting distance of 0-40% of the blade length.

2. The air turbine starter of claim 1, wherein the blade cutter comprises a disk with the cutting edge extending at least axially from the disk.

3. The air turbine starter of claim 1, wherein the at least one blade defines an axial chord length and the blade cutter defines a cutter length less than the axial chord length.

4. The air turbine starter of claim 1, further comprising a containment ring positioned radially outward of the rotatable turbine member.

5. An air turbine starter for starting an engine, comprising:
a starter housing defining an inlet, an outlet, and a flow path extending between the inlet and the outlet;
a rotatable turbine member comprising a central hub defining a platform, and at least one blade extending radially from the platform between a root and a tip; and
a blade cutter having a cutting edge, wherein the cutting edge confronts the blade at or between the root and the tip.

6. The air turbine starter of claim 5, wherein the cutting edge is radially positioned closer to the root than the tip.

7. The air turbine starter of claim 5, wherein the blade cutter extends radially into the flow path.

8. The air turbine starter of claim 5, further comprising a seal located adjacent the turbine member and coupled to the blade cutter.

9. The air turbine starter of claim 5, wherein the blade cutter comprises a disk, and wherein a cutting edge axially extends from the disk.

10. The air turbine starter of claim 9, further comprising a blade length defined between the root and the tip, with the cutting edge radially spaced from the root between 0-40% of the blade length.

11. The air turbine starter of claim 5, wherein the blade defines an axial chord length and the blade cutter defines a cutter length less than the axial chord length.

12. The air turbine starter of claim 5, wherein the blade defines an axial chord length and the blade cutter is configured to form a cut in the blade defining a cut depth for removing the at least one blade, wherein the cut depth is a nonzero value between 0-40% of the axial chord length.

13. The air turbine starter of claim 5, further comprising a containment ring positioned radially outward of the rotatable turbine member.

14. An air turbine starter for starting an engine, comprising:
a starter housing defining an inlet, an outlet, and a flow path extending between the inlet and the outlet;
a rotatable turbine member comprising a central hub defining a platform, and at least one blade extending radially from the platform between a root and a tip, and also extending between a leading edge and a trailing edge to define an axial chord length;
a blade cutter having a cutting edge confronting the at least one blade proximate the root, wherein the blade cutter defines an axial cutter length less than the axial chord length; and
wherein the blade cutter is configured to form a cut in the blade defining a cut depth for removing the at least one blade, wherein the cut depth is a nonzero value between 0-40% of the axial cutter length.

15. The air turbine starter of claim 14, wherein the blade cutter extends radially into the flow path.

16. The air turbine starter of claim 14, wherein the blade cutter comprises a disk, and wherein a cutting edge axially extends from the disk.

17. The air turbine starter of claim 14, further comprising a containment ring positioned radially outward of the rotatable turbine member.

18. The air turbine starter of claim 14, further comprising a seal located adjacent the rotatable turbine member and coupled to the blade cutter.

19. An air turbine starter for starting an engine, comprising:
a starter housing defining an inlet, an outlet, and a flow path extending between the inlet and the outlet;
a rotatable turbine member located within the starter housing and comprising a central hub defining a platform, and at least one blade extending radially from the platform between a root and a tip, with the root and tip defining an annular swept area during normal rotational operation; and
a blade cutter located downstream of the rotatable turbine member and in registry with the annular swept area;
wherein the at least one blade defines an axial chord length and the blade cutter is configured to form a cut in the at least one blade defining a cut depth for removing the at least one blade, wherein the cut depth is a nonzero value between 0-40% of the axial chord length.

20. The air turbine starter of claim 19, wherein the blade cutter comprises a disk, and wherein a cutting edge axially extends from the disk.

* * * * *